United States Patent

[11] 3,575,672

[72] Inventor Frank W. Weber
Duarte, Calif.
[21] Appl. No. 660,484
[22] Filed Aug. 14, 1967
[45] Patented Apr. 20, 1971
[73] Assignee Burroughs Corporation
Detroit, Mich.

[54] SYNCHRONIZABLE PULSE SOURCE
7 Claims, 6 Drawing Figs.

[52] U.S. Cl. .......... 331/117, 331/168, 331/173
[51] Int. Cl. .......... H03b 5/08
[50] Field of Search .......... 331/117, 168, 173

[56] References Cited
UNITED STATES PATENTS

| | | | |
|---|---|---|---|
| 2,986,709 | 5/1961 | Myers | 331/117 |
| 3,332,031 | 7/1967 | Reid | 331/173 |
| 3,337,816 | 8/1967 | Vercellotti | 331/173 |
| 3,402,363 | 9/1968 | Johnson | 331/117 |

OTHER REFERENCES
" ELECTRONIC DESIGNERS' HANDBOOK" by Landee, Davis, & Albrecht, McGraw Hill Book Co., Page 6—14, Copyright 1957, Library of Congress Catalog Card No. 56—6898

*Primary Examiner*—James W. Moffitt
*Assistant Examiner*—Vincent P. Canney
*Attorney*—Christie, Parker & Hale

ABSTRACT: A source of repetitive voltage pulses having an input terminal for the application of an inhibit signal to stop the source from producing its output signal with the source having the ability to immediately produce its output at the selected frequency without a stabilization period upon the removal of the inhibit signal.

A plurality of such sources are used to provide an exact synchronized clock pulse train in a timing system for timing the recovery of data from a magnetic data storage file.

INVENTOR.
FRANK W. WEBER

BY
Christie, Parker & Hale
ATTORNEYS

INVENTOR.
FRANK W. WEBER
BY
Christie, Parker & Hale
ATTORNEYS

SYNCHRONIZABLE PULSE SOURCE

BACKGROUND OF THE INVENTION

1. Field of the Invention

This invention relates to sources of selected frequency-repetitive voltage pulses having a precisely controllable duration of output, which sources have particular application in timing systems for information storage and retrieval equipment.

In certain applications, such as timing systems for timing the recovery of data from a magnetic data storage file, a source of repetitive voltage pulses at a selected frequency with the ability to stop and start the source without distortion in the output signal is required. A system requiring such a source is described in an application by Arnold Jorgenson, Lorrin Anderson, and Jacob Vigil, Ser. No. 660,485 entitled DATA STORAGE TIMING SYSTEM, filed Aug. 14, 1967, and assigned to the same assignee as the present application.

In the referenced application the source is required to supply a pulse train that has a prescribed frequency. Additionally, in the referenced application the source must be precisely controllable so that the source may be stopped or disabled within a time period that is considerably less than a pulse width. In addition the source must have the ability to generate the repetitive voltage pulses on command at the selected frequency without distortion by way of phase shifts.

2. Description of the Prior Art

Most oscillators, such as the Hartley, Colpitts, and Armstrong oscillators, employ high Q-parallel-tuned inductor-capacitor circuits operating at a selected resonant frequency. When this type of oscillator is shut off it will continue to generate an output signal of diminishing frequency. Additionally, when this type of oscillator is first enabled, or turned on, it generally takes a plurality of pulses before the output frequency is stabilized. Because of these characteristics of the well-known oscillators they cannot be used in timing systems for the recovery of data stored on a magnetic data storage file where the oscillator output is employed as the clock for the recovery of the data.

SUMMARY OF THE INVENTION

The above disadvantages and shortcomings of the well-known oscillator circuits are overcome in accordance with the present invention by employing a relatively low Q-circuit comprising a series-connected inductor and capacitor with a regenerative signal being fed to the tuned circuit by an inverter and high-gain emitter-follower as a source of repetitive voltage pulses.

The source further includes a voltage-responsive switch connected between ground reference and the output of the inverter which is connected to the input of the emitter-follower. Thereafter, the application of a voltage pulse of the correct polarity to the voltage-responsive switch will inhibit the output of the oscillator. Additionally, upon subsequent removal of the pulse, the source will generate repetitive voltage pulses having a nearly square wave at the correct frequency without delay or a period of stabilization. A plurality of these oscillators have particular application in timing systems wherein the oscillators operate at different individual frequencies and act as sources of clock pulse trains to be employed in the recovery of data from associated zones of magnetic data storage files wherein the information is stored in each zone at a frequency that is related to the frequency of one of the individual oscillators.

BRIEF DESCRIPTION OF THE DRAWING

The above and other features and advantages will be understood more clearly and further upon consideration of the following specification and the accompanying drawing in which.

DETAILED DESCRIPTION OF THE PREFERRED EMBODIMENT

Figure 1:
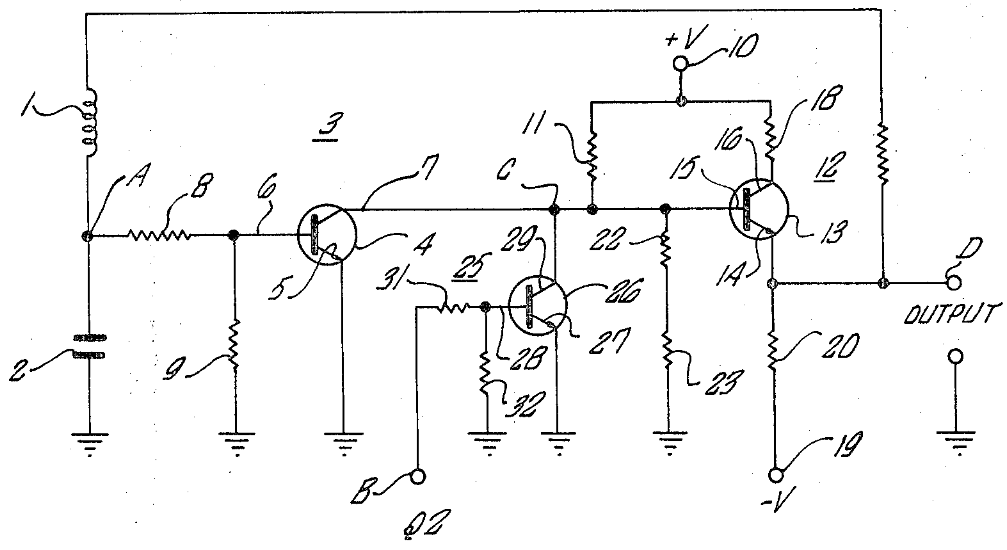
FIG. 1 is a schematic electrical diagram of a switchable source of repetitive voltage pulses in accordance with the present invention.

In FIG. 1 there is shown a source of repetitive voltage pulses, the output of which is controllable without the generation of pulses after the application of the inhibit signal of a duration longer than a generated pulse width and with the generation of pulses at the selected frequency upon the removal of the inhibit signal. The source includes an inductor 1 and a capacitor 2 connected in series as a tuned series circuit. This inductor and capacitor in conjunction with the stray inductances and capacitances in the circuit determine the frequency of the output from the source.

Across the capacitor 2 is connected an inverter 3 comprising an active element, which is a transistor 4 having an emitter 5, base 6, and collector 7. The base 6 is connected to the junction between inductor 1 and capacitor 2 through a resistor 8. The base 6 is also connected to ground reference through another resistor 9. The collector 7 of transistor 4 is connected to a positive voltage source 10 through a resistor 11.

The output of the inverter is coupled from collector 7 to an emitter-follower 12. The active element of emitter-follower 12 is a transistor 13 which has an emitter 14, base 15 and collector 16. The collector 16 of transistor 13 is connected to the positive voltage source 10 through a resistor 18 while the emitter 14 is connected to a negative voltage source 19 through a resistor 20, which is the load resistor of the emitter-follower 12. The base 15 of transistor 13 is connected to ground reference through a voltage divider made up of resistors 22 and 23.

The above-described elements cooperate to form a source for the generation of repetitive voltage pulses at a selected frequency with the pulses being advantageously substantially square waves to represent binary data. The output of the source appears at point D in FIG. 1 which is the voltage appearing between emitter 14 and ground reference. The shape of the output waveform is improved in accordance with the present invention by connecting a resistor 24 in the feedback path between the emitter-follower 12 and the tuned circuit of inductor 1 and capacitor 2 to provide isolation between the circuits.

The inverter 3 is responsive to the voltage across the capacitor 2 and applies a voltage to the emitter-follower, which voltage has a polarity which is the inverse of the polarity of the voltage across the capacitor 2. The emitter-follower 12 is a current-gain amplifier which has a conduction path through the inductor 1 and capacitor 2 when the transistor 13 is in its conduction state. This current path provides regenerative feedback to the inductor 1 and capacitor 2 to sustain the oscillations in the series circuit.

The inductor 1 and capacitor 2 form a relatively low Q-tuned circuit. The use of a low Q-tuned circuit is possible because of the high gain of the inverter and emitter-follower circuit. Because of the low Q-tuned circuit the removal of the feedback current from the emitter-follower to the tuned circuit will cause a cessation of oscillations in a very short time. Thus, any means of turning off the emitter-follower will effectively remove or inhibit the output from the source which appears at point D at the emitter 14 of transistor 13.

A means for turning off transistor 13 in the emitter-follower 12 is the voltage-responsive switch 25 which is connected between the base 15 of transistor 13 and ground reference. The voltage-responsive switch includes transistor 26 having an emitter 27, base 28, and collector 29. The collector 29 is connected to base 15 of transistor 13 while the emitter 27 is connected to ground reference. The input signal to the switch 25 is applied to point B which is connected to the base 28 through a resistor 31. The input signal is developed at the base 28 across resistor 32 which is connected between the base 28 and ground reference.

Transistor 26 is an NPN transistor so that a positive voltage on the base 28 with respect to the emitter 27 will cause conduction in the transistor 26 between the collector and emitter. If the level of the voltage at the base 28 is high enough, transistor 26 will be placed in saturation so that the ground reference will effectively appear at the collector 29 and thus at base 15 of transistor 13. With the saturation of transistor 26 to apply essentially ground reference to the base 15 of transistor 13, transistor 13 will approach shutoff so that no further output will be generated by the source. In this manner, approximately ground reference or zero volts will appear at point D or the emitter 14 since the emitter 14 substantially follows base 15 of transistor 13 when connected as an emitter-follower.

Figure 1A:
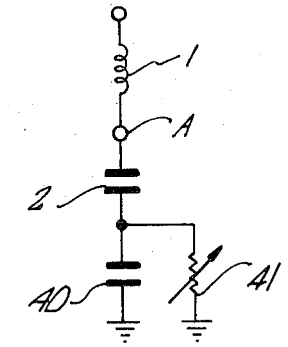
FIGS. 1A and 1B are schematic diagrams of alternative tuned circuits for a variable frequency source in accordance with the present invention.
Figure 1B:
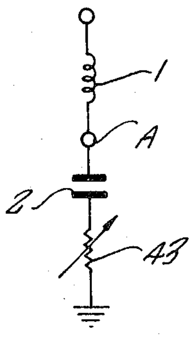

The source shown in FIG. 1 is a fixed frequency source which may be made into a variable frequency source by employing one of the tuned circuits shown in FIGS. 1A and 1B in place of the tuned circuit of FIG. 1. In FIG. 1A, the tuned circuit includes an additional capacitor 40 connected in series with inductor 1 and capacitor 2. In parallel with the capacitor 40 is connected a variable resistor 41 so that the effective resistance in the tuned circuit may be controlled by varying the amount of resistance in parallel with capacitor 40. An alternative simpler means for varying the frequency of the source is shown in FIG. 1B. The effective capacitance of the tuned circuit that determines the frequency of operation of the source is varied by employing a variable resistor 43 connected in series with inductor 1 and capacitor 2. The use of a variable resistor is particularly advantageous when the source is in the form of an integrated circuit because variable capacitors and variable inductors are disproportionately large compared to variable resistors.

Figure 2:
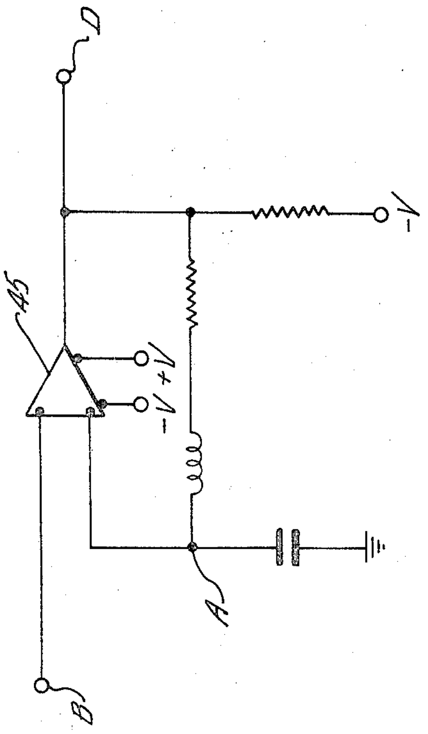
FIG. 2 is a schematic and logic diagram of the source of FIG. 1.

The source of repetitive voltage pulses of FIG. 1 can be represented as a logic element, as shown in FIG. 2. The inverter 3 and current gain emitter-follower 12 are represented by the element 45 in FIG. 2. In logical terminology, a true signal at point B will place the voltage-responsive switch 25 in its closed position to inhibit the output from the source. Thus, under these conditions, the output at point D will be approximately zero volts or at ground reference, and in logic terms, the output will be false. The output will continue to be false so long as a true signal is applied at point B.

Figure 3:
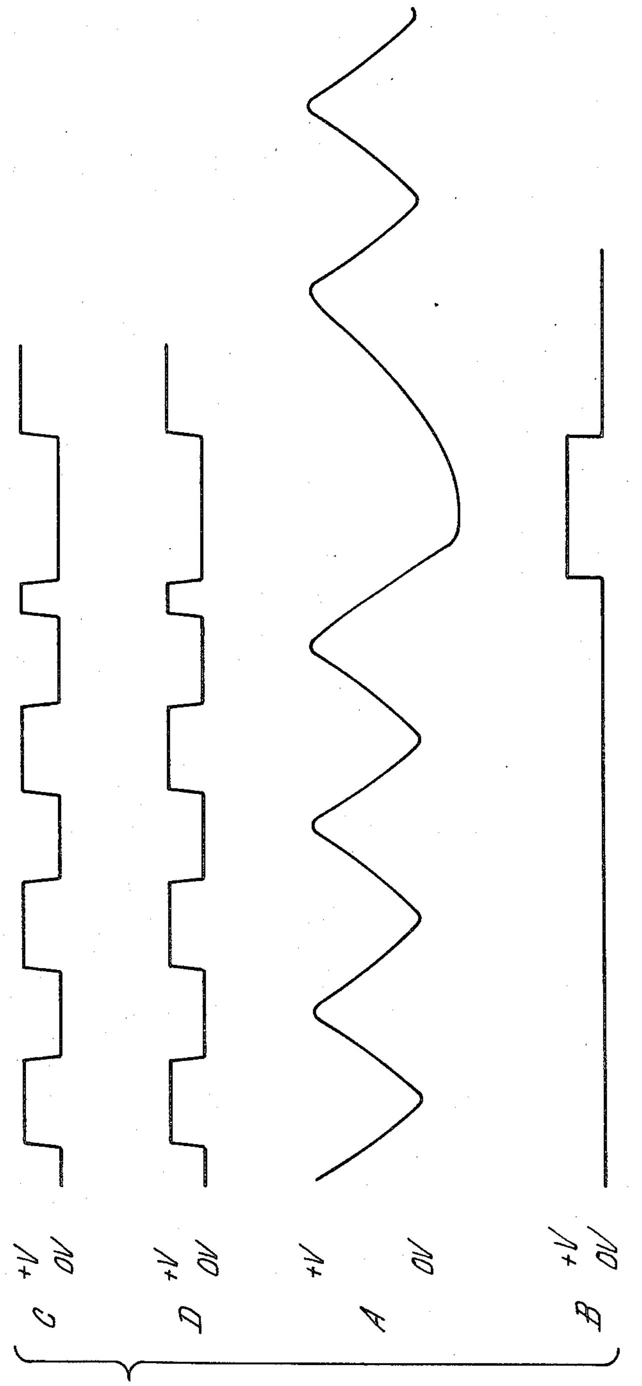
FIG. 3 is a timing chart showing the voltage levels at selected points in the source of FIG. 1, which timing chart is useful in promoting a clear understanding of the operation of the circuitry.

The operation of the source of FIGS. 1 and 2 may be understood more easily by reference to the timing chart of FIG. 3, wherein the voltage levels at points A, B, C, and D are shown. It is assumed at time $t_0$ in FIG. 3 that the oscillator is in its normal operating condition and that transistor 4 is on and nearly saturated and transistor 13 is off. With transistor 4 on and nearly saturated, substantially ground reference appears at point C, and similarly substantially ground reference appears at point D. This zero voltage or ground reference at point D is fed back through inductor 1 to the input of transistor 4 at point A. As point A approaches ground reference, the base 6 of transistor 4 becomes less positive with respect to emitter 5 of transistor 4 and shuts transistor 4 off. With the shutting off of transistor 4, the voltage level at point C increases in the positive direction so that base 15 of transistor 13 becomes positive with respect to emitter 14 and turns transistor 13 on. As point C becomes more positive, transistor 13 will conduct more and approach saturation.

In emitter-follower circuit 12, the voltage at emitter 14 effectively follows the voltage at base 15 so that the voltage level at point D with respect to ground is essentially the same as the voltage level at point C with respect to ground. This is shown by curves C and D in FIG. 3.

When transistor 13 of emitter-follower 12 begins conducting one of its current paths from the positive voltage source 10 is through its collector resistor 18 and its collector emitter junction to inductor 1 and capacitor 2 and then back to the positive voltage source 10. Since the emitter-follower 12 has a current gain it provides a regenerative signal to the tuned circuit of inductor 1 and capacitor 2 to sustain the oscillations in the tuned circuit.

With transistor 13 conducting and a positive voltage level appearing at point D, this positive voltage level is fed back to the input of transistor 4 of the inverter 3 through inductor 1. After a period of delay caused primarily by the inductance of inductor 1, the positive voltage will appear at base 6 of transistor 4 to turn this transistor back on. With transistor 4 again in the "on" condition, transistor 13 will be turned off. This cycle repeats itself with repetitive voltage pulses being produced at point D as shown in curve D of FIG. 3.

When it is desired to shut the oscillator off, it is only necessary to apply a positive voltage to point B at the input to the voltage-responsive switch 25. This positive voltage may be applied to point B when it is desired to synchronize the output of the oscillator with the voltage pulse appearing at point B or when it is desired to select some other oscillator when the oscillator of FIGS. 1 and 2 is one of a plurality.

The oscillator of the present invention has particular applicability to timing systems for timing the retrieval of information from magnetic storage files. In particular, the oscillator of the present invention is extremely useful in a timing system such as the one described in the above-referred to concurrently filed application. In the referenced application there are a plurality of oscillators required, with each oscillator operating at a different frequency from the other oscillators.

In particular, in the timing system of the referenced application the magnetic storage file includes disc files wherein the information is stored in zones provided on the face of each file. Different frequencies are assigned to each zone for the most efficient storage. For example, in the referenced application there are three zones on the face of a disc file with the outermost zone from the center of the file having a frequency of 2 megacycles for the storage of the information. The intermediate zone has a frequency of 1½ megacycles, and the innermost zone has a frequency of 1 megacycle. Further, in the timing system the oscillators are provided to generate repetitive voltage pulses that are at a selected frequency with respect to the frequency assigned to the zone that the oscillator is associated with. In one particular application the oscillators produce an output that has a frequency that is nine times the frequency assigned to its associated zone. Thus, the oscillator associated with zone 3 will produce an output signal at a frequency of 18 megacycles.

Figure 4:
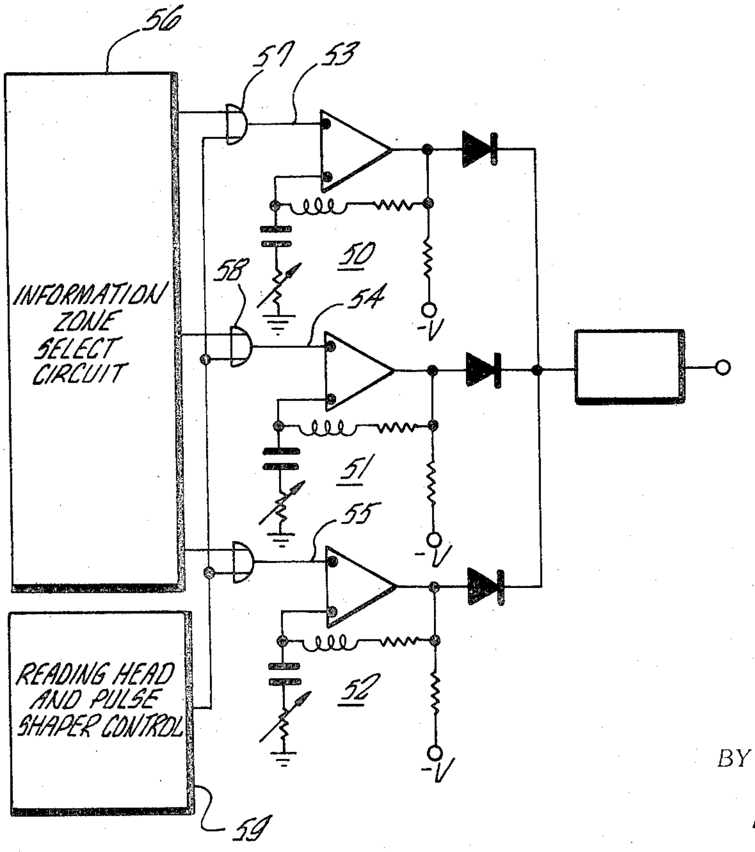
FIG. 4 is a schematic and logic diagram showing the application of the sources of FIG. 1 to a timing system for the retrieval of recorded data in accordance with the present invention.

The application of the oscillators of the present invention to a timing system such as the one described in the referenced application is shown in FIG. 4. It is assumed that the timing system is associated with information storage and retrieval equipment incorporating magnetic disc files having three information zones on the face of the file. It is further assumed that each oscillator is associated with one of the three zones and produces an output signal that is nine times the frequency of the clock employed for the storage of information in the particular information zone.

Thus, there are three oscillators 50, 51, and 52 shown in FIG. 4. The oscillators are represented as logic elements with the individual tuned circuits being shown in detail in FIG. 4. Oscillator 50 has an input terminal 53, oscillator 51 has an input terminal 54, and oscillator 52 has an input terminal 55 that correspond to the control terminal of the voltage-responsive switch 25 of the oscillator shown in FIG. 1.

Thus, an input signal having a positive voltage level or a logic true signal appearing on these input terminals will inhibit the oscillators so that no output signal will be produced. In this manner, the oscillator that is to produce the output signal for the generation of the repetitive voltage pulses to time the retrieval of the information from the storage file may be easily selected by applying a true signal to the input terminal of the other two oscillators. The application of this true signal is provided by the information zone select unit 56. For example, if oscillator 50 is associated with zone 1; 51 is associated with zone 2; and 52 is associated with zone 3, and zone 3 is the zone from which the information is to be read, then a true signal will be applied to input terminals 53 and 54 by unit 56 through the OR gates 57 and 58 at the input to oscillators 50 and 51, respectively.

In the timing systems, such as the one in the referenced application the output of the selected oscillator has to be synchronized with the clock pulse train that is recovered from the clock track that is associated with the selected information zone from which the data is being recovered. This may be easily accomplished in accordance with the present invention by applying the clock pulse train or a pulse train that has the same repetition rate as the recovered clock pulse train as a true signal to the input terminals 53, 54, and 55 of the oscillators.

In FIG. 4, the synchronizing clock pulse train is generated by the reading head and pulse shaper control 59. As shown by curves B and D in FIG. 3, a true signal at point B of the oscillator of FIG. 1 which corresponds to the input terminals 53, 54, and 55 of the oscillators in FIG. 4, will remove the output from the oscillator for the duration of the true signal. If the true signal of curve B takes the form of a pulse train at the output of the reading head and pulse shaper 59 in FIG. 4, then the selected oscillator associated with the zone from which the information is being read may be readily continuously synchronized.

Various changes may be made in the details of construction without departing from the spirit and scope of the invention as defined by the appended claims.

I claim:

1. A synchronizable source of repetitive voltage pulses comprising an inductor and a capacitor connected in series, an inverter having an input terminal and an output terminal, means for connecting the input terminal to the junction between the inductor and the capacitor, an emitter-follower having an input terminal and an output terminal, means for connecting the input terminal of said emitter-follower to the output terminal of said inverter, a voltage-responsive switch connected between the output terminal of said inverter and ground reference, and means for connecting the output terminal of said emitter-follower to said inductor.

2. A switchable source in accordance with claim 1, including a variable resistor connected in series with said inductor and said capacitor.

3. A switchable source in accordance with claim 1, including a second capacitor connected in series with said inductor and said capacitor.

4. A switchable source in accordance with claim 3, including a variable resistor connected in parallel with said second capacitor.

5. A synchronizable oscillator comprising:
a low Q-tuned circuit,
a voltage amplifier having an input from said tuned circuit,
a current amplifier connected to the output of said voltage amplifier,
a feedback circuit connected between the output of said current amplifier and said tuned circuit, and
a normally open switch connected to remove the input signal to the current amplifier from the voltage amplifier, the closing of said switch causing the removal of any output signal from the current amplifier and the subsequent opening permitting the current amplifier to have an output signal associated in time to the opening of the switch.

6. A synchronizable oscillator comprising:
an inductor and a capacitor connected in series, with the capacitor being connected to ground reference,
a first transistor operable as an amplifier having its base connected to the junction of the inductor and the capacitor and its emitter connected to ground reference,
a source of negative potential,
a source of positive potential,
a first resistor,
a second transistor operable as a current amplifier having its base connected to the collector of the first transistor, its emitter connected through the first resistor to the negative potential source, its collector connected to the positive potential source,
a circuit means connecting the emitter of the second transistor to the inductor, and
a third transistor operable as a voltage-responsive switch having its collector connected to the collector of the first and the base of the second transistors, its emitter to ground, and its base to a control terminal.

7. A controllable oscillator for producing a predetermined number of pulses in a selected time period with one pulse in each time period being synchronized with a pulse of a time-varying input signal supplied to the oscillator from an independent source, said oscillator comprising:
an inductor and capacitor connected to form a series tuned circuit, said inductor and capacitor having inductance and capacitance values that cooperate to form a low Q-tuned circuit;
an inverter coupled to the tuned circuit and responsive to the voltage across a portion of the tuned circuit;
a current amplifier coupled to the output of the inverter and responsive to the voltage at the output of the inverter;
a circuit means connected between the output of the current amplifier and the tuned circuit for coupling a portion of the output of the current amplifier to the tuned circuit; and
a voltage-responsive circuit means connected to the output of the inverter and to the input of the current amplifier for biasing the current amplifier at a point of substantially zero current flow through the current amplifier upon the application of a pulse from said independent source to the voltage-responsive circuit means.